(12) United States Patent
Ludwig

(10) Patent No.: US 8,854,054 B2
(45) Date of Patent: Oct. 7, 2014

(54) ROTATION ANGLE SENSOR

(75) Inventor: Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/520,552

(22) PCT Filed: Nov. 5, 2010

(86) PCT No.: PCT/EP2010/066870
§ 371 (c)(1), (2), (4) Date: Oct. 2, 2012

(87) PCT Pub. No.: WO2011/082862
PCT Pub. Date: Jul. 14, 2011

(65) Prior Publication Data
US 2013/0015862 A1  Jan. 17, 2013

(30) Foreign Application Priority Data
Jan. 5, 2010 (DE) .......................... 10 2010 000 671

(51) Int. Cl.
G01R 27/26 (2006.01)
G01L 3/10 (2006.01)
G01D 5/24 (2006.01)
G01L 5/22 (2006.01)

(52) U.S. Cl.
CPC ................. *G01L 3/109* (2013.01); *G01L 3/106* (2013.01); *G01D 5/2405* (2013.01); *G01L 5/221* (2013.01)
USPC ........................................................ 324/658

(58) Field of Classification Search
CPC .. G01D 5/2405; G01D 5/2417; G01L 5/2417; G01L 3/106; G01L 3/109; G01L 5/221; G01L 3/10; G01R 27/26
See application file for complete search history.

(56) References Cited

U.S. PATENT DOCUMENTS

| | | | |
|---|---|---|---|
| 3,421,371 A | 1/1969 | Williams, Jr. | |
| 6,483,321 B2 | 11/2002 | Brasseur | |
| 6,564,654 B2 * | 5/2003 | Madni et al. | 73/862.337 |
| 7,602,173 B2 | 10/2009 | Reichert | |
| 8,624,879 B2 * | 1/2014 | Yang | 345/184 |

FOREIGN PATENT DOCUMENTS

| | | |
|---|---|---|
| DE | 10 2005 031 086 | 1/2007 |
| EP | 1 396 703 | 3/2004 |
| JP | 61076928 | 4/1986 |
| JP | 63-52067 | 3/1988 |
| JP | 10-19602 | 1/1998 |
| JP | 10-232104 | 9/1998 |
| JP | 2001-272289 | 10/2001 |
| JP | 2001-517314 | 10/2001 |

(Continued)

OTHER PUBLICATIONS

International Search Report, PCT International Application No. PCT/EP2010/066870, dated Feb. 1, 2011.

*Primary Examiner* — Tung X Nguyen
(74) *Attorney, Agent, or Firm* — Kenyon & Kenyon LLP

(57) ABSTRACT

A rotation angle sensor which has at least one capacitor having capacitor plates and a dielectric designed as a disk. The disk is situated between the capacitor plates, and fills out differently sized surface portions between the capacitor plates, depending on the rotation angle. The rotation angle sensor is designed to determine the rotation angle as a function of a measured value of the capacitance of the at least one capacitor.

5 Claims, 12 Drawing Sheets

(56) References Cited

FOREIGN PATENT DOCUMENTS

| JP | 2002-542476 | 12/2002 |
| JP | 2004-294238 | 10/2004 |
| JP | 2008-51751 | 3/2008 |
| JP | 2008-545146 | 12/2008 |
| JP | 2009-47547 | 3/2009 |
| JP | 2009-162741 | 7/2009 |
| WO | WO 98/43046 | 10/1998 |

* cited by examiner

ROTATION ANGLE SENSOR

FIELD OF THE INVENTION

The present invention relates to a rotation angle sensor, a torque sensor, a method for determining a rotation angle, and a method for determining a torque.

BACKGROUND INFORMATION

Magnetic measuring methods are usually used nowadays in the field of torque sensors and rotation angle sensors. One example of such is the TSS-1 torque sensor from Robert Bosch GmbH, in which a magnetic field which changes during a rotary motion is detected using Hall sensors, and a measured signal is converted into a rotation angle signal or a torque signal. These sensors are characterized in particular by their high angular resolution, which may sometimes be less than 0.01°.

However, for these types of sensors, high manufacturing costs result for large, high-volume mass applications due to complicated and expensive components, for example an oppositely polarized magnet ring or the metallic flux conducting elements necessary for conducting the magnetic flux. In addition, the complicated assembly and connection technology must be taken into account, since the measuring Hall elements are aligned with very high positional accuracy with respect to the magnetic flux, and this position must be maintained over the entire service life of a sensor in order to avoid drift of the sensor.

A sensor system for detecting a differential angle is described in German Patent Application No. DE 10 2005 031 086 A1. This sensor system includes at least one magnetic field-sensitive sensor element, with the aid of which the magnetic field information of a magnetic circuit composed of a magnetic pole wheel and ferromagnetic flux rings having teeth is evaluatable. The teeth extend in the radial direction for radially tapping the magnetic field information of the magnetic pole wheel.

A capacitive angular position sensor is described in European Patent No. EP 1 396 703 A2. This sensor includes two circular capacitive plates and a semicircular rotor, made of dielectric material, which is situated on a shaft to be rotatable with the shaft. The two plates are stationarily mounted on the shaft. Thus, a capacitance between the two plates is defined by an angle-dependent position of the dielectric rotor, via which an angle of the shaft may in turn be determined.

A system for determining a speed and an angular position of a shaft is described in U.S. Pat. No. 3,421,371. The speed and angular position of the shaft are likewise capacitively detected. For this purpose, the system likewise includes two plates of a capacitor which are situated fixed in place on the shaft, and a dielectric rotor, rotatably attached to the shaft, which is situated between these two plates. It is provided that the rotor is designed as a circular disk, this rotor being attached to the shaft at a point which is offset with respect to the center point of the rotor.

PCT Application No. WO 98/43046 A2 describes a capacitive sensor for rotation angle and angular velocity, having two electrodes in the shape of annular sectors which are insulated from one another and which have predefined centering angles. Between these two electrodes, a rotor having at least one sector-shaped blade which is aligned with respect to the rotational axis of the shaft is situated on a shaft.

A torque sensor is described in Japanese Patent Application No. JP 61076928 A, which includes a first rotation angle sensor and a second rotation angle sensor which are connected to one another via a torsion bar.

SUMMARY

Against this background, a rotation angle sensor and a torque sensor, as well as a method for determining a rotation angle and a torque, having the features of the independent patent claims are presented.

The present invention relates to, among other things, a torque sensor which measures capacitively via the rotation angle-dependent change in the permittivity, and which may be used, for example, for electronic steering assistance in a vehicle.

A measuring principle of the capacitively measuring torque sensor is based on a rotation angle-dependent, typically spatial change of the rotatable dielectric situated between capacitor plates of a capacitor. This results in a change in the permittivity $\epsilon$, which is also referred to as the dielectric conductivity, via which a change in the capacitance of the capacitor may be brought about. The rotation angle may be determined as a function of a surface portion of the dielectric situated between the capacitor plates.

Various specific embodiments are possible with regard to a shape of components of the capacitor, e.g., a plate capacitor, having a moving dielectric. These specific embodiments relate to, among other things, a shape of the, e.g., flat dielectric designed as a disk. In addition, an attachment of the disk at an axis defined via a shaft should be taken into account. The disk may be attached, as a function of its shape, at the axis of the shaft in such a way that the disk has an angle-dependent extension perpendicular to the axis. This also includes the option that the radius of the disk, starting from a pivot point of the axis, is angle-dependent. It is, thus, possible to asymmetrically attach disks of various shapes, for example circular disks, at the pivot point. If it is provided that a disk is to be symmetrically attached at the pivot point, it should be ensured that with respect to its center point, the disk has different, angle-dependent extensions, and therefore, also angle-dependent radii.

The disk, designed as a dielectric, of the at least one capacitor of the rotation angle sensor may be attached to the shaft. The permittivity and the capacitance of the at least one capacitor are also changed as a function of a rotation angle of the shaft. A rotation angle of the shaft may thus be determined via the measured capacitance.

In a first specific embodiment of a torque sensor having a described capacitor, it is provided that an asymmetrically supported circular disk made of plastic, for example, is situated on a shaft, and thus, on the axis. The capacitor plates are located on both sides of this disk. A certain surface portion of the disk is situated between the capacitor plates as a function of the rotation angle of the shaft, and a formal and/or functional relationship between the surface portion and the angle, for example a functional dependency of the rotation angle on the surface portion of the dielectric, may be determined by measurement and/or computation; an angle-dependent extension of the disk, starting from the pivot point of the axis, may be taken into account. Since the disk, as a dielectric, has a different permittivity than air, the capacitance of this capacitor changes as a function of the surface portion, i.e., the extension, of the disk between the two capacitor plates. The measurable capacitance is thus a function of the rotation angle of the shaft.

For measuring a torque, one specific embodiment of a torque sensor is provided which has two measuring systems which are designed as rotation angle sensors and situated on two shafts having axes. These axes may be situated coaxially with respect to one another and joined together via a torsion bar or a torsion bar spring. If no torque is applied to the torque sensor, the capacitance of both measuring systems is exactly the same for the rotation angles; i.e., the difference in capacitance as a measured variable is then equal to zero. However, if a torque is applied to a shaft, the shafts of both measuring systems, and thus the torque sensors, twist relative to one another, depending on the design of the torsion bar. A difference between the capacitances of the two measuring systems is thus measurable as a function of a difference in the rotation angles. The magnitude of this difference and/or a phase shift of the measured rotation angles is/are a measure of the applied torque. The two disks of the rotation angle sensors provided for determining the torque may be indirectly connected to one another via the shafts, which in turn are connected to one another via the torsion bar.

With the aid of the present invention, a contactless measuring method may be implemented which is not subject to friction and which does not generate noise. The provided measuring system has a compact, robust design and is manufacturable in a cost-effective manner, since in direct comparison to magnetically measuring systems, the use of magnets, Hall ICs, flux conductors, etc., and therefore, expensive components, is not necessary.

A measuring system, i.e., a rotation angle sensor or a torque sensor, includes a relatively simple assembly and connection technology. A design based on relative measurement is used to determine the torque. Environmental influences, for example temperature changes, atmospheric humidity, etc., thus play no role in the difference in the capacitance to be evaluated.

A redundantly designed device may be easily provided by doubling the number of rotation angle sensors. An electronic unit, typically an evaluation circuit, is spatially separable from the measuring system. Thus, problems with electrically conductive swarfs, among other problems, are not to be expected.

Within the scope of the present invention, a torque sensor having a measuring principle which is an alternative to the magnetic measuring principle and having an acceptable angular resolution is provided. Use is thus made of the influence of the permittivity on the capacitance of capacitor systems to be measured for detecting an angle of a system rotating about a shaft. The measuring system, typically at least one rotation angle sensor, may be used in various sensors for detecting rotary motions.

A rotation angle sensor according to the present invention is designed to carry out all steps of the presented method for determining the rotation angle.

Individual steps of the method may also be carried out by individual components of the rotation angle sensor. In addition, functions of the rotation angle sensor or functions of individual components of the rotation angle sensor may be implemented as steps of the method for determining the rotation angle. Furthermore, it is possible for steps of the method to be implemented as functions of at least one component of the rotation angle sensor or of the overall rotation angle sensor. The torque sensor according to the present invention may include at least one rotation angle sensor according to the present invention. Accordingly, the torque sensor is suitable for carrying out steps of the method for determining the torque. Likewise, functions of at least one component of the torque sensor may also be implemented as steps of the method for determining the torque.

Further advantages and embodiments of the present invention result from the description and the figures.

It is understood that the features stated above and to be explained below may be used not only in the particular stated combination, but also in other combinations or alone without departing from the scope of the present invention.

DETAILED DESCRIPTION OF EXAMPLE EMBODIMENTS

Figure 1A:
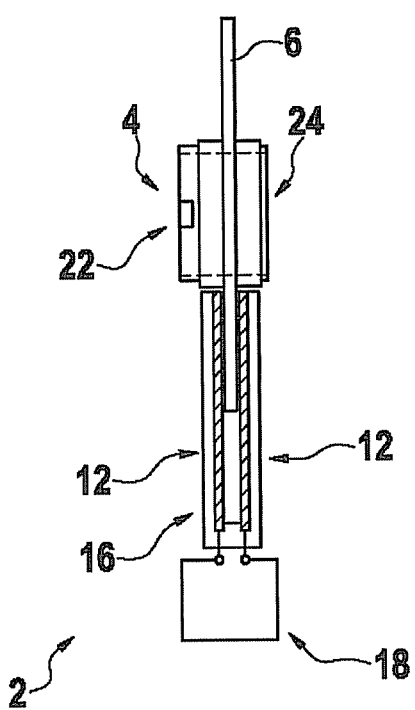
FIG. 1 shows a schematic illustration of a first example of a rotation angle sensor according to the present invention, from two perspectives.

The present invention is schematically illustrated in the figures based on a specific embodiment, and is described in greater detail below with reference to the figures.

The figures are described in an interrelated and all-encompassing manner, with identical components being denoted by the same reference numerals.

Figure 1B:
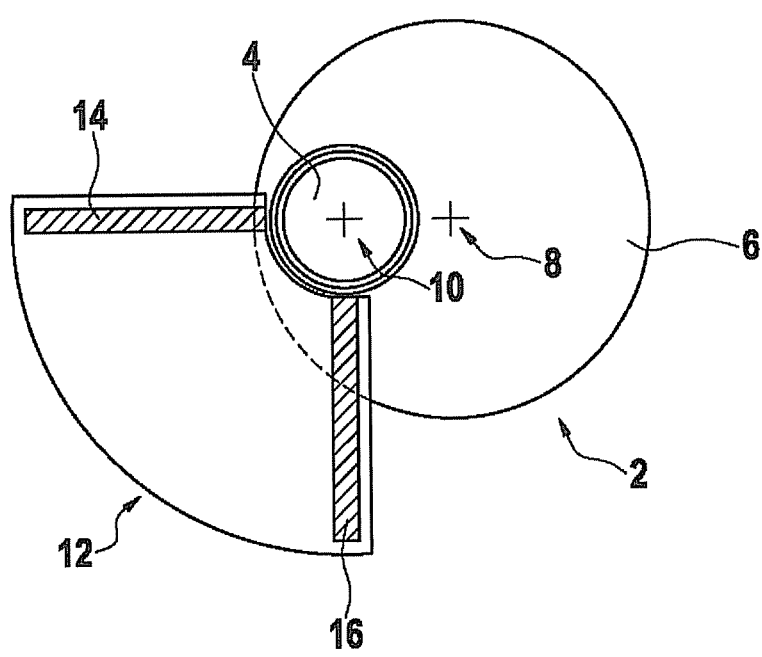

FIG. 1 shows a schematic illustration of a first example of a rotation angle sensor 2 according to the present invention in a top view (FIG. 1b) and in a side view (FIG. 1a). A flat, circular disk 6 made of plastic is attached to a shaft 4; disk 6 together with shaft 4 have a shared axis or a shared pivot point which has a distance from a center point 8 of disk 6 which is greater than zero. In the present case, the distance corresponds to approximately one-third of the diameter of disk 6. Generally, a distance between one-fourth and one-half of the diameter of disk 6 may be provided. A rotation of shaft 4 causes disk 6 to rotate asymmetrically about axis 10.

Two mutually parallel plates 12 made of plastic, for example, are provided on both sides of this disk 6. In the present case, these two plates 12 include metallic regions, in a hatched illustration, which form the parallel capacitor plates of a first capacitor 14 C1 which is designed here as a plate capacitor, and a second capacitor 16 C2 which is designed here as a plate capacitor. Thus, a dielectric composed of an air portion, or a surface portion, and a portion of disk 6 made of plastic, or a surface portion, is located between the capacitor plates of capacitors 14, 16. The mentioned portions change during the rotary motion of shaft 4, and thus, of disk 6. For determining the angle-dependent permittivity of capacitors 14, 16, it is sufficient to take the angle-dependent surface portion of disk 6 into account. Since the permittivity of disk 6 is different from that of air, the capacitance of capacitors 14, 16 changes depending on the surface portion of air and of plastic between plates 12. When there is either minimum or maximum overlap between the surfaces of plates 12 and of the surface portion of disk 6 made of plastic, the change in the overall permittivity is very low, for which reason second capacitor 16 C2 is situated at an angle of 90° with respect to first capacitor 14 C1.

In addition, an intelligent unit 18 for signal processing is provided which always considers, and thus uses, the greatest difference in capacitance of the two capacitors 14, 16 C1, C2 for evaluating the change. An anti-rotation groove 20 and a metal bushing 22 are also shown in FIG. 1a.

In torque sensor 2 from FIG. 1, the ratio of the dielectrics, which is determined by the surface portion of disk 6 between plates 12, changes during a rotary motion of axis 10. Since the permittivity of air is different from that of plastic, for example, the rotary motion of asymmetrically supported disk 6 may be measured as the change in the capacitance of capacitors 14, 16.

The following expression applies for the capacitance of a capacitor 14, 16: $C=\epsilon_0 \times \epsilon_r \times A/d$, where $\epsilon_0 = 8.85418781762$, As/Vm is the permittivity of free space, $\epsilon_{r\,air} = 1.00059$ is the permittivity of air, $\epsilon_{r\,ABS} =$ approximately 4.3 is the permittivity of the usable plastic ABS, A is the surface area of a capacitor plate of a capacitor 14, 16, and d is the distance between oppositely situated capacitor plates of a capacitor 14, 16.

To measure a torque, two measuring systems designed as rotation angle sensors 26, 28 are provided on two shafts 30, 32, respectively, which are connected to one another via a torsion bar 34. A torque sensor 36 formed by the two rotation angle sensors 26, 28 is illustrated in a top view in FIG. 2 and in a sectional view in FIG. 3, rotation angle sensors 26, 28 which have a similar design to rotation angle sensor 2 illustrated in FIG. 1 being used in the described example. In addition, torque sensor 36 is schematically illustrated in a top view in FIG. 4.

Figure 4:
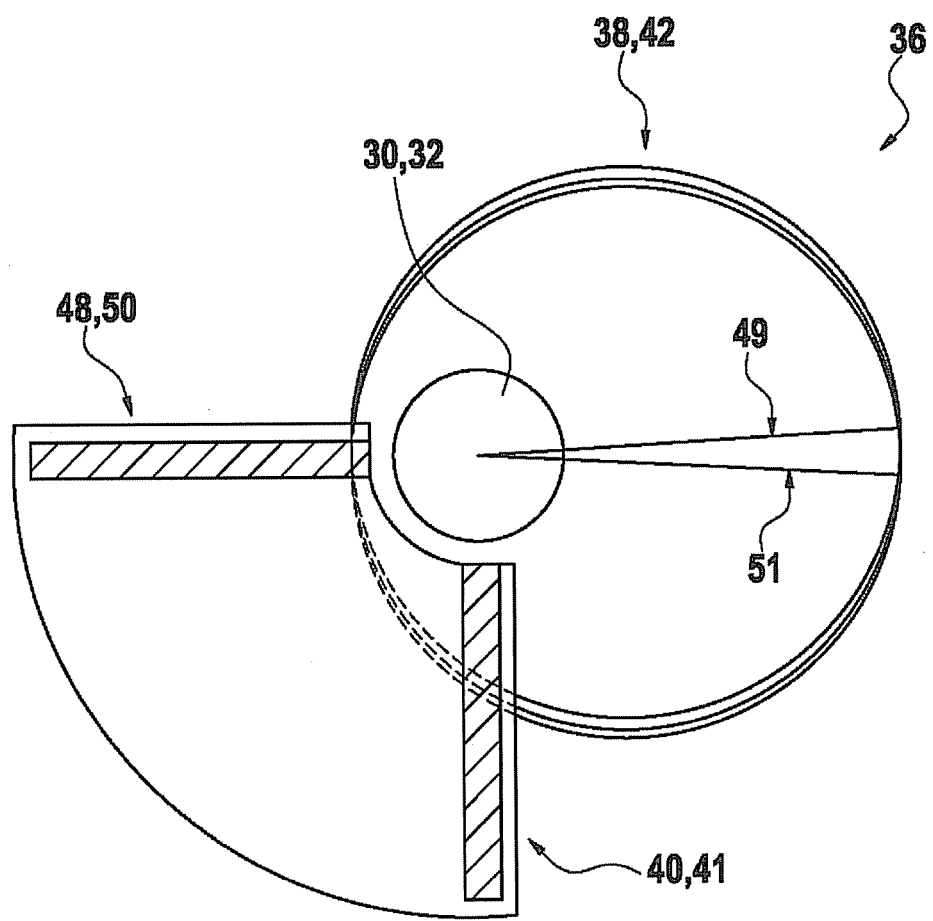
FIG. 4 shows a schematic illustration of the torque sensor from FIGS. 2 and 3 in a top view when determining a torque.

A first rotation angle sensor 26 includes a flat, circular disk 38 as a dielectric, which is located between a first capacitor 40, designed here as a plate capacitor, and a second capacitor 48, designed here as a plate capacitor (FIG. 4), which are offset by 90° relative to an axis of first shaft 30. In addition, disk 38 is asymmetrically supported on shaft 30. Similarly, second rotation angle sensor 28 likewise has a flat, circular disk 42 which is asymmetrically attached to second shaft 32, and which is able to undergo an asymmetrical rotary motion between two capacitors 41, 50 which are offset by 90° (FIG. 4). It is also provided that first shaft 30 is connected to a steering gear of a vehicle, and the second shaft is connected to the steering wheel of the vehicle.

When a torque is now applied to first shaft 30, disk 38 on first shaft 30 twists relative to second disk 42, designed as a plastic plate, on the other, second shaft 32 which is connected to first shaft 30, and thus to first disk 38, via torsion bar 34. This relative change in the rotation results in a phase shift of the measurable change in the capacitance over the rotation angle. This phase shift is a measure of the magnitude of the torque. In addition, torque sensor 36 is situated inside a sensor housing 44 which is sealed off with respect to axes 30, 32 via sealing rings 46.

A change in the permittivity of the air due to temperature fluctuations and/or moisture has no influence on the measurement, since only the relative change between first capacitors 40, 48 on first shaft 30 and second capacitors 41, 50 on second shaft 32 is crucial for the torque.

Figure 2:
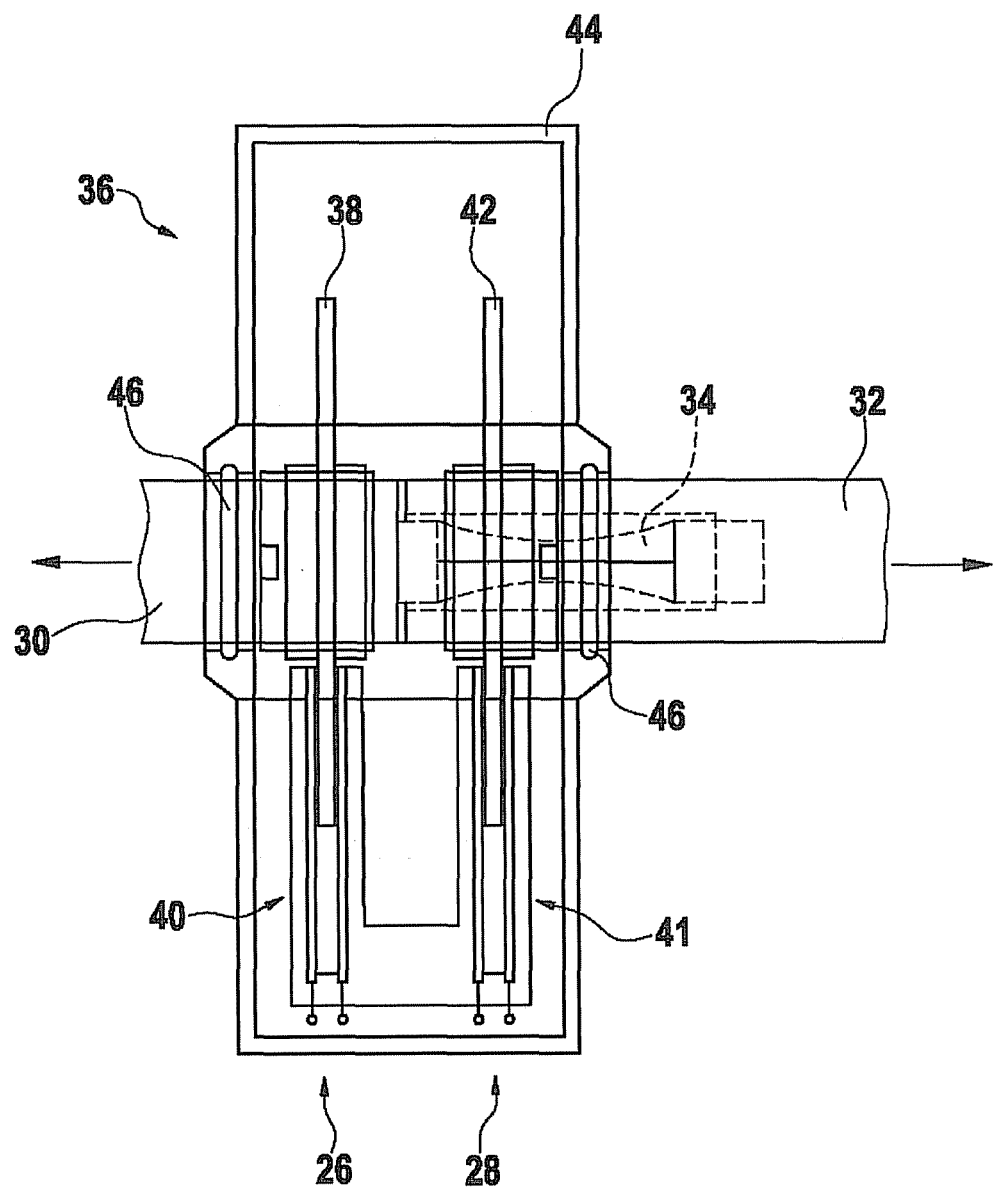
FIG. 2 shows a schematic illustration of a first example embodiment of a torque sensor.
Figure 3:
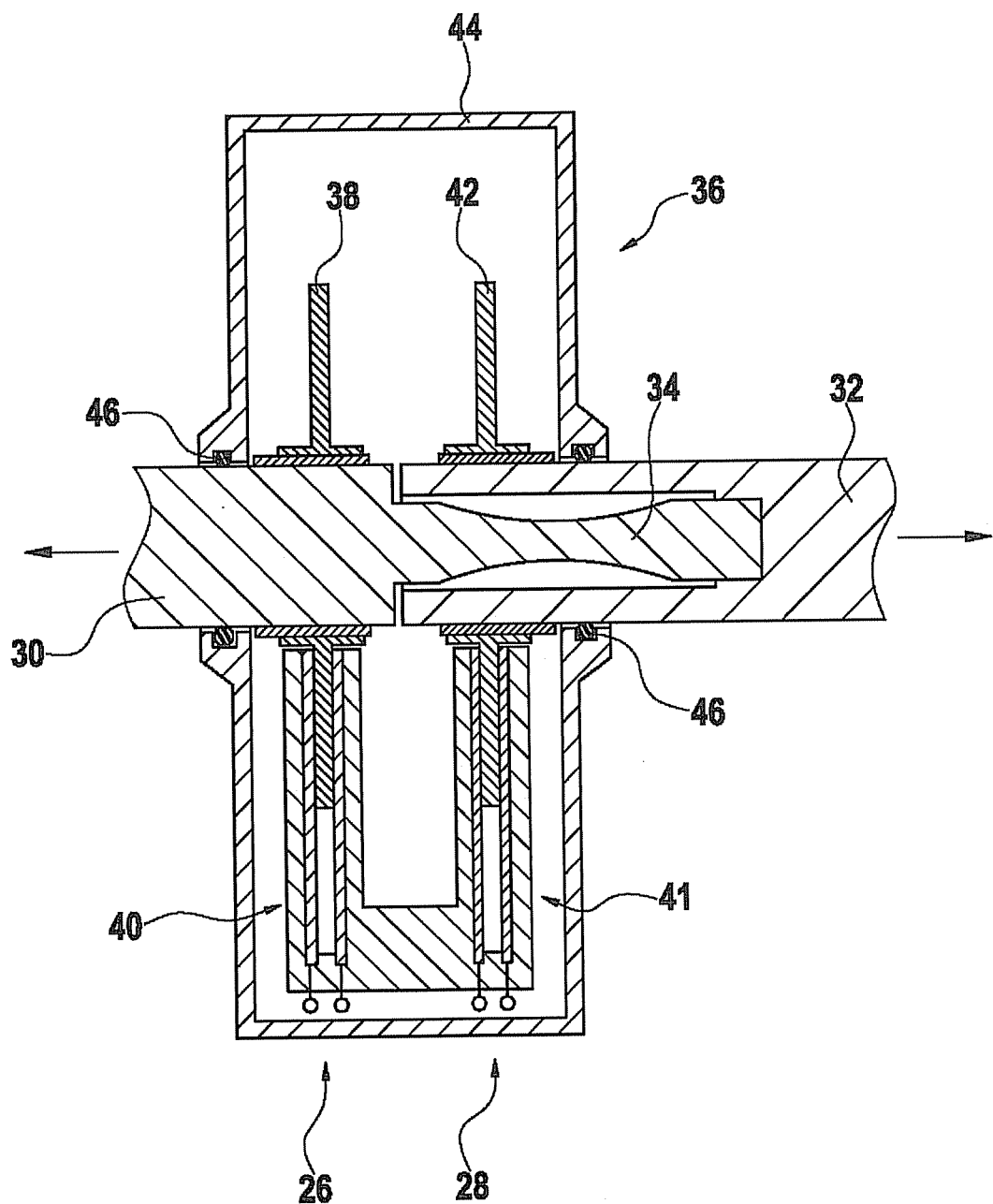
FIG. 3 shows a schematic illustration of the torque sensor from FIG. 2 in a sectional view.

To explain a method for determining a torque, FIG. 4 illustrates torque sensor 36, already presented in FIGS. 2 and 3, from a perspective oriented in the direction of the two shafts 30, 32. Accordingly, in this perspective, shafts 30, 32 as well as first capacitors 40, 41 and second capacitors 48, 50 offset by 90° relative thereto are illustrated on top of or behind one another. FIG. 4 also shows that the two disks 38, 42 of the two rotation angle sensors 26, 28, respectively, are not congruently situated with respect to one another. This effect occurs when a torque is applied to both shafts 30, 32.

To carry out the method for determining the torque, a signal concerning a measured capacitance, which represents an angle-dependent value of the capacitances of capacitors 40, 48 of first rotation angle sensor 24 and of capacitors 41, 50 of second rotation angle sensor 28, is generally used for the evaluation, difference ΔC of the capacitances being greatest when a torsion, in the present case a "torsion of +2°" 49 and a "torsion of [−]3°" 51, is present between shafts 30, 32.

In the embodiment, first rotation angle sensor 26 uses a capacitance C1G of first capacitor 40 and a capacitance C1A of second capacitor 48. Second rotation angle sensor 28 uses a capacitance C2G of first capacitor 41 and a capacitance C2A of second capacitor 50. In addition, ratios ΔC1A/C1G, ΔC2A/C2G of ascertained capacitances C1G, C1A, C2G, C2A are used, a first ratio ΔC1A/C1G being formed from a capacitance C1A of first capacitor 40 of second rotation angle sensor 28, and a capacitance C2G of first capacitor 41 of first rotation angle sensor 26. To form second ratio ΔC2A/C2G, a capacitance C2A of second capacitor 32 of second rotation angle sensor 28 and a capacitance C2G of second capacitor 48 of first torque sensor 26 are used. Accordingly, it is provided that capacitances of two capacitors 40, 41 and 48, 50, which in each case are situated one behind the other or congruently with respect to shafts 30, 32, are taken into account to form mentioned ratios ΔC1A/C1G, ΔC2A/C2G. However, the largest ascertained ratio ΔC1A/C1G, ΔC2A/C2G is always used for the evaluation.

If ΔC1A/C1G>ΔC2A/C2G, ΔC1A/C1G is used in the evaluation, and if ΔC1A/C1G<ΔC2A/C2G, ΔC2A/C2G is used in the evaluation.

Figure 5:
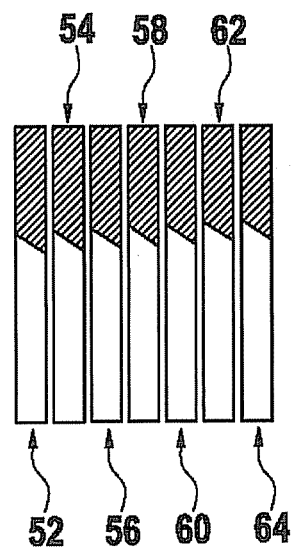
FIG. 5 shows a schematic illustration of a detail of the first specific embodiment of the method according to the present invention for determining the torque.

Furthermore, FIG. 5 shows examples of angle-dependent surface portions 52, 54, 56, 58, 60, 62, 64 of a disk 38, 42, shown in FIGS. 2 through 4, between two capacitor plates of a capacitor 40, 41, 48, 50, and thus an overlap of the capacitor plates with disk 38, 42 (hatched area). A white area shows the surface portion of the air between the capacitor plates. A first surface portion 52 corresponds to a deviation of the rotation angle of −3° between shafts 30, 32, second surface portion 54 corresponds to a deviation of the rotation angle of −2° between shafts 30, 32, third surface portion 56 corresponds to a deviation of the rotation angle of −1° between shafts 30, 32, fourth surface portion 58 corresponds to a deviation of the rotation angle of 0° between shafts 30, 32, fifth surface portion 60 corresponds to a deviation of the rotation angle of +1° between shafts 30, 32, sixth surface portion 62 corresponds to a deviation of the rotation angle of +2°, and seventh surface portion 64 corresponds to a deviation of the rotation angle of +3°.

Figure 6:
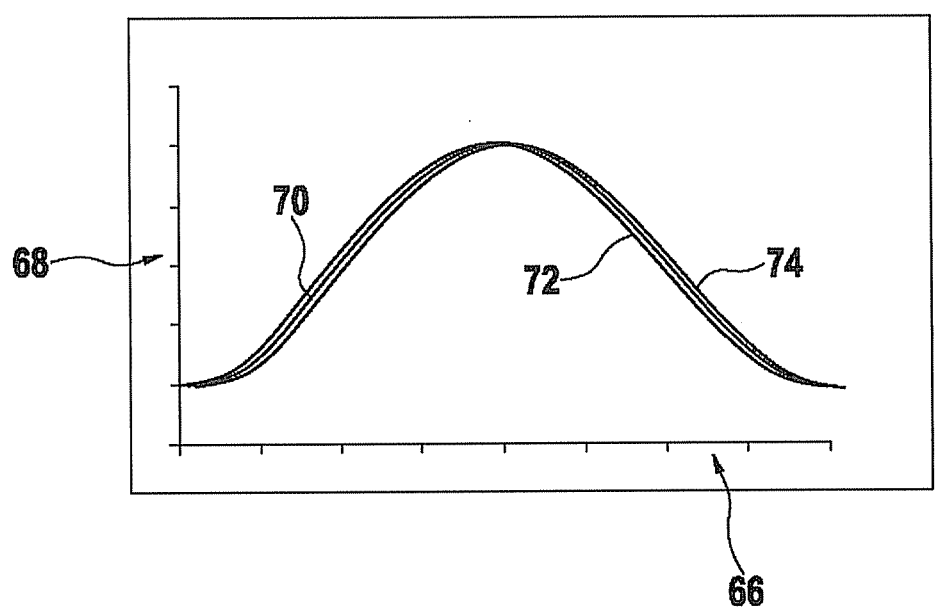
FIG. 6 shows a schematic illustration of a diagram of the first specific embodiment of the method according to the present invention for determining the torque.

The diagram in FIG. 6 includes a horizontally oriented axis 66 along which angles for one revolution between 0° and 360° are plotted. An amplitude based on one of above-mentioned ratios $\Delta C1A/C1G$, $\Delta C2A/C2G$ of ascertained capacitances C1A, C2A, C1G, C2G is plotted along a vertically oriented axis 68. The diagram shows a first curve 70 for a circle 0°, a second curve 72 for "torsion of +3°" 49, and a third curve 74 for "torsion of −3°" 51.

Figure 7A:
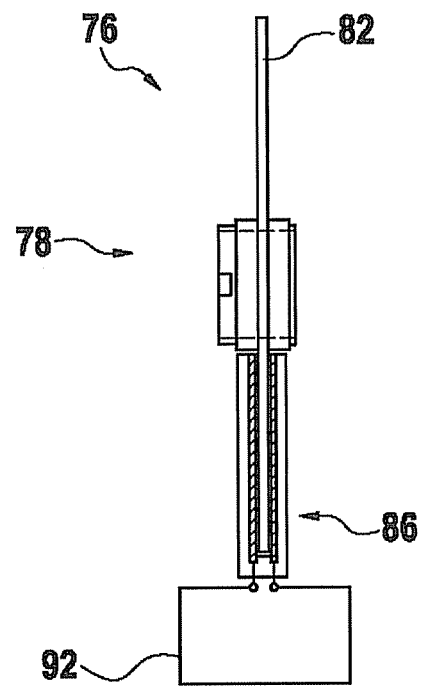
FIG. 7 shows a schematic illustration of a specific embodiment of a rotation angle sensor according to the present invention, from two perspectives.
Figure 7B:
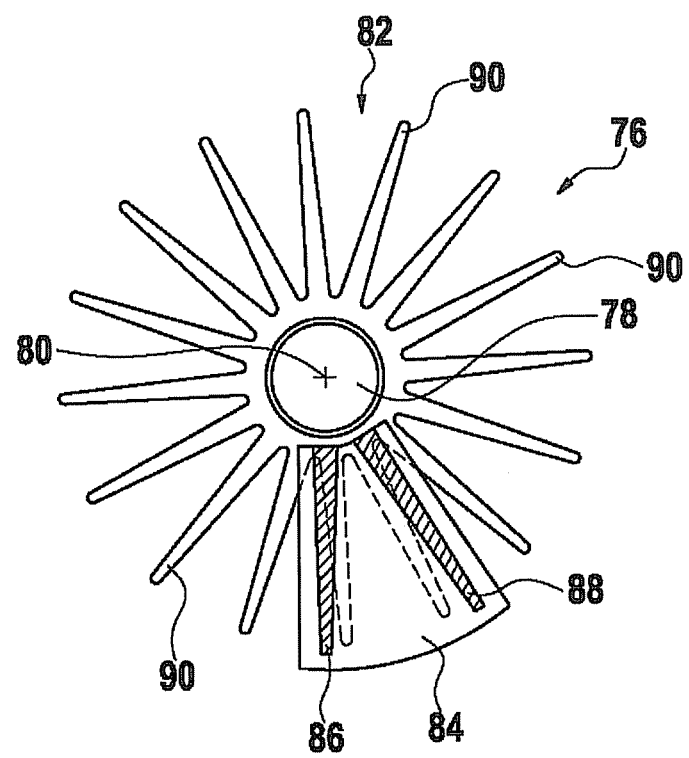

FIG. 7a shows a schematic illustration of a specific embodiment of the rotation angle sensor 76 according to the present invention, from a side perspective. FIG. 7b shows the same rotation angle sensor 76 in a top view. A flat, star-shaped disk 82 made of plastic and having a symmetrical pivot point is situated on a shaft 78 having an axis 80, the symmetrical pivot point also corresponding to a pivot point, i.e., axis 80 of shaft 78. Plates 84 of the same size, made of plastic, are located on both sides of this disk 82, metallic regions of these plates 84 together forming two capacitors 86, 88 designed as plate capacitors. Thus, a dielectric composed of an air portion and a portion of disk 82 made of plastic is located between the capacitor plates of each capacitor 86, 88. The latter portion changes during the rotary motion of shaft 78, and thus, of disk 82. Since the permittivity of portion of disk 82 made of plastic is different from that of air, the capacitance of capacitors 86, 88 changes, depending on the surface portion of air and of plastic between the capacitor plates. Since the change in the overall permittivity is very low when there is either minimum or maximum overlap between the surfaces of the capacitor plates and disk 82 made of plastic, two capacitors 86, 88 are provided for the system of rotation angle sensor 76, in the present case the two capacitors being situated at an angle relative to one another which is larger than an angle between two star points 90 of star-shaped disk 82. In addition, an intelligent unit 92 for signal processing is provided which is used for evaluating the change in the greatest difference in capacitance.

In the second specific embodiment of rotation angle sensor 76, a much greater edge steepness of the phases relative to one another results compared to the presented example of rotation angle sensor 2, and thus, a greater difference in the capacitances at a comparable angle. It is thus possible to achieve higher angular resolutions than in rotation angle sensor 2.

The ratio of the dielectrics between the capacitor plates changes during a rotary motion of the axis. Since the permittivity of air is different from that of plastic, for example, the change in surface area of star points 90 with respect to a capacitor 86, 88 due to the rotary motion may be measured as a change in the capacitance.

Figure 8:
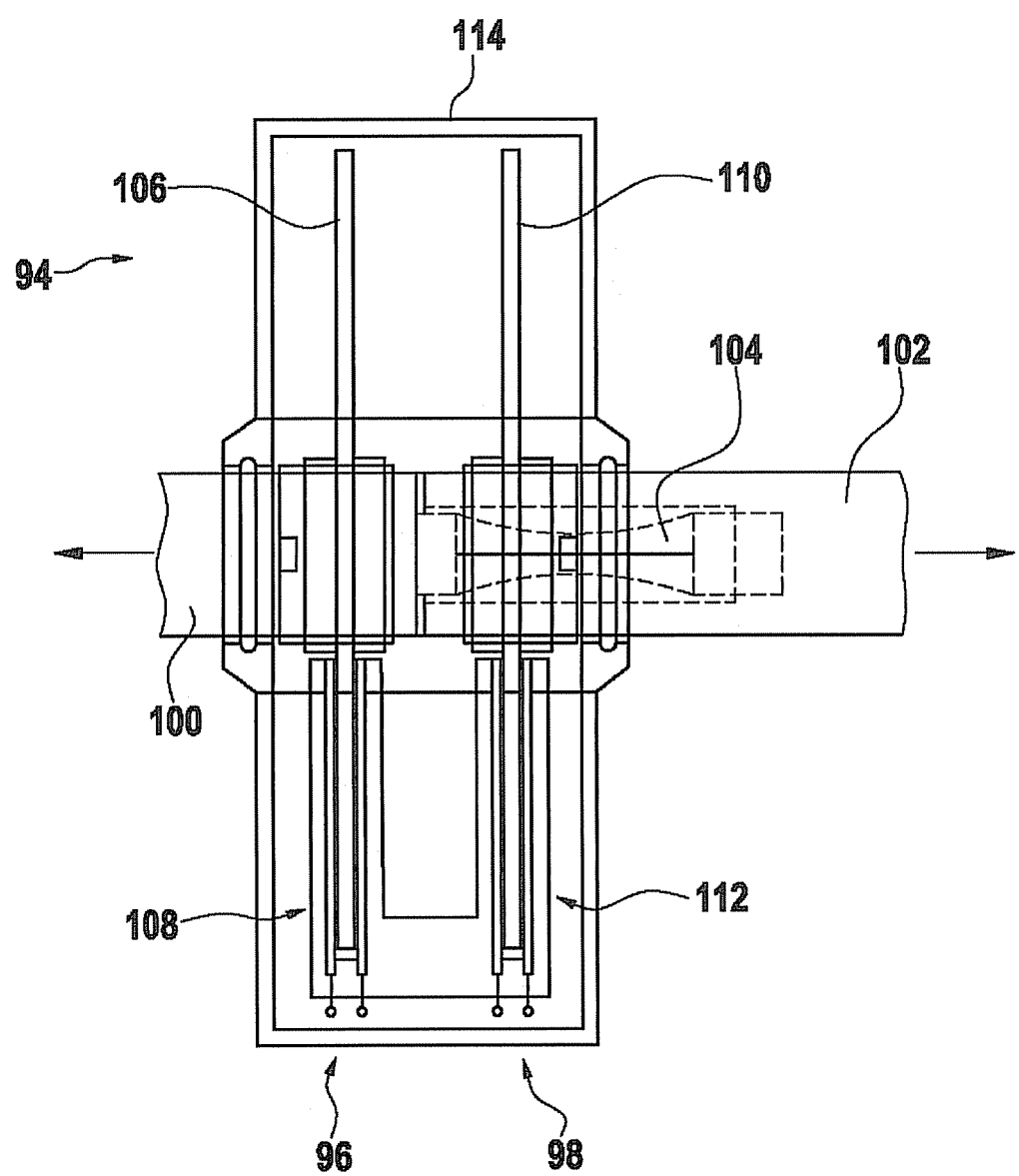
FIG. 8 shows a schematic illustration of a second specific embodiment of the torque sensor according to the present invention.
Figure 9:
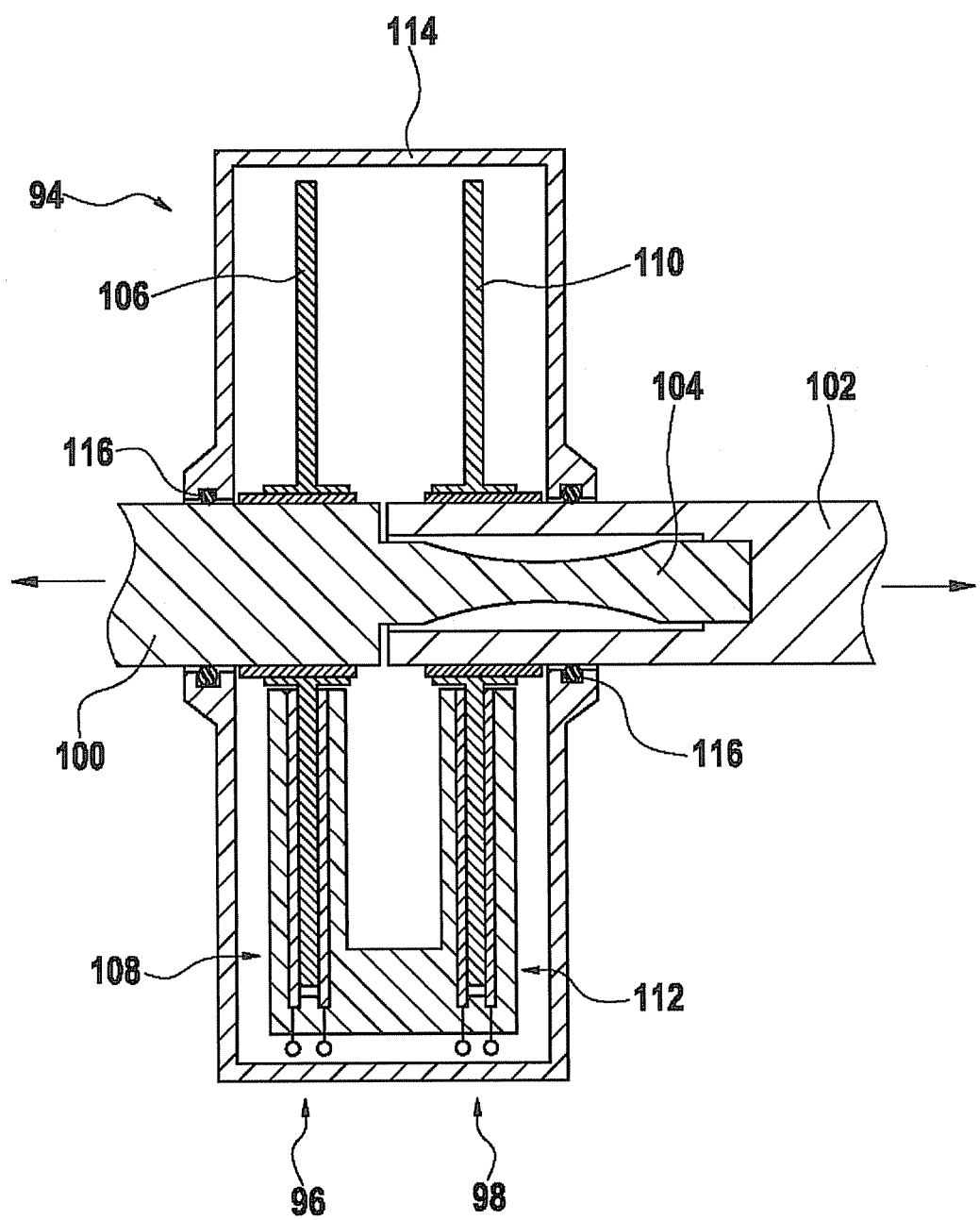
FIG. 9 shows a schematic illustration of the torque sensor from FIG. 8 in a sectional view.
Figure 10:
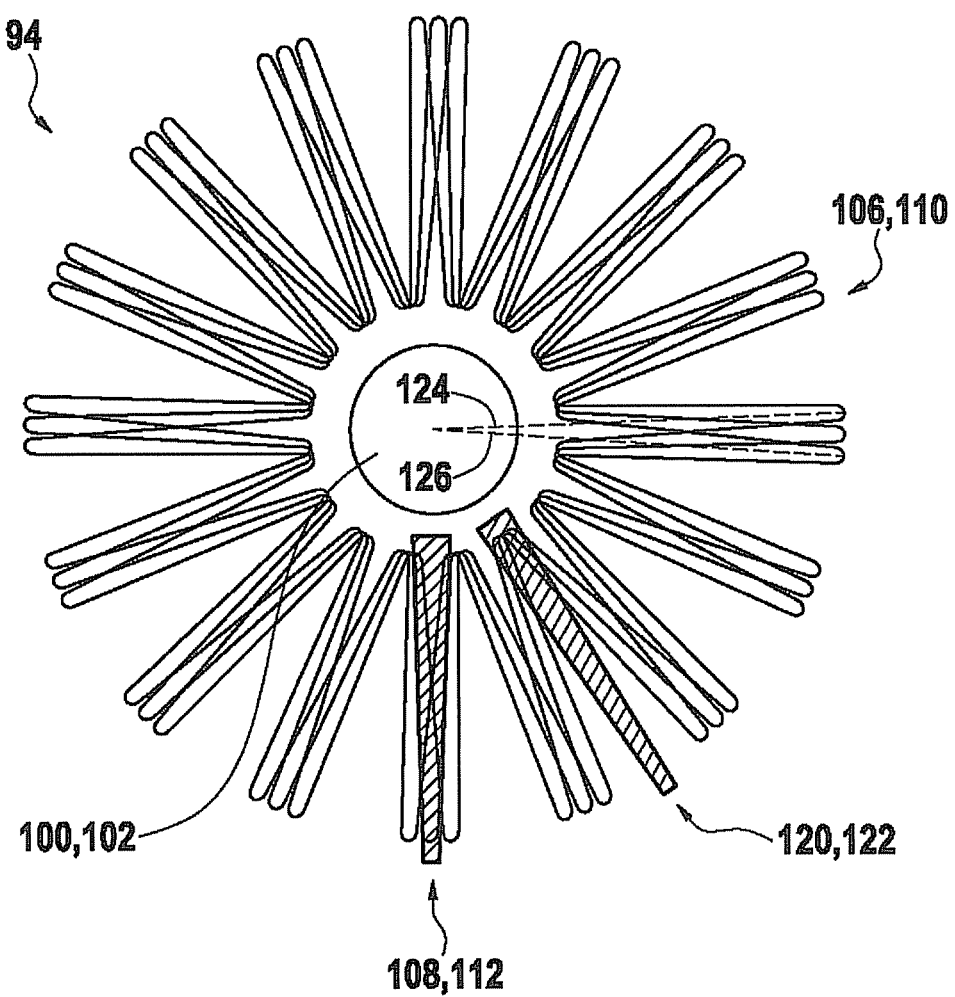
FIG. 10 shows a schematic illustration of the torque sensor from FIGS. 8 and 9 in a top view when carrying out an embodiment of the method according to the present invention for determining a torque.

FIGS. 8 and 9 show a schematic illustration of a second specific embodiment of torque sensor 94 according to the present invention, from a side perspective and in a sectional view, respectively. For measuring a torque, two rotation angle sensors 96, 98 as measuring systems are provided on two shafts 100, 102, respectively, which are connected to one another via a torsion bar 104. These rotation angle sensors 96, 98 have a similar design to rotation angle sensor 76 already illustrated in FIG. 7. Furthermore, FIG. 10 shows torque sensor 94 in a top view. Each of the two schematically shown measuring systems includes flat, star-shaped disks 106, 110, respectively, each of which is symmetrically supported on shafts 100, 102, respectively, and a double arrangement of two pairs of capacitors 108, 120 (FIGS. 10) and 112, 122 (FIG. 10), respectively, which are offset at an angle relative to one another.

A first rotation angle sensor 96 situated on a first shaft 100 of a steering gear includes a star-shaped disk 106 which is symmetrically attached to first shaft 100. Disk 106 between capacitor plates of capacitors 108, 120, designed here as plate capacitors (FIG. 10), of first rotation angle sensor 96 causes a change in capacitance when first shaft 100 rotates. A star-shaped disk 110 of second rotation angle sensor 98 is symmetrically situated on second shaft 102 and moves between the capacitor plate of second capacitors 112, 122 (FIG. 10), which likewise are designed as plate capacitors, when second shaft 102 rotates. Second shaft 102 is connected to a steering wheel. The two rotation angle sensors 96, 98 are situated in a housing 114 which is sealed off with respect to axes 100, 102 via sealing rings 116. When a torque is now applied to first shaft 100, star-shaped disk 106 on first shaft 100 twists relative to second star-shaped disk 110 on the other, second shaft 102, the two shafts being connected to one another via torsion bar 104. This relative change results in a phase shift of the measurable change in the capacitances over the rotation angle. The phase shift is a measure of the magnitude of the torque applied to axes 100, 102.

To explain the embodiment of the method according to the present invention for determining a torque, FIG. 10 illustrates torque sensor 94, already presented in FIGS. 8 and 9, from a perspective oriented in the direction of the two shafts 100, 102. Accordingly, in this perspective, shafts 100, 102 as well as first capacitors 108, 112 and second capacitors 120, 122 offset by an angle are illustrated on top of or behind one another. FIG. 10 also shows that the two star-shaped disks 106, 110 of the two rotation angle sensors 96, 98, respectively, are twisted with respect to one another, which results when a torque is applied to the two shafts 100, 106.

For determining the torque, a signal concerning a measured capacitance, which represents an angle-dependent value of the capacitances of capacitors 108, 120 of first rotation angle sensor 96 and of capacitors 112, 122 of second rotation angle sensor 98, is generally used for the evaluation, difference AC of the capacitances being greatest when a torsion, in the present case a "torsion of +3°" 124 and a "torsion of −°" 126, is present between shafts 100, 102.

In the embodiment, first rotation angle sensor 96 uses a capacitance C1G of first capacitor 108 and a capacitance C1A of second capacitor 120. Second rotation angle sensor 98 uses a capacitance C2G of first capacitor 112 and a capacitance C2A of second capacitor 122. In addition, ratios $\Delta C1A/C1G$, $\Delta C2A/C2G$ of ascertained capacitances C1G, C1A, C2G, C2A are used, a first ratio $\Delta C1A/C1G$ being formed from a capacitance C1A of first capacitor 112 of second rotation angle sensor 98, and a capacitance C2G of first capacitor 118 of first rotation angle sensor 96. To form second ratio $\Delta C2A/C2G$, a capacitance C2A of second capacitor 112 of second rotation angle sensor 98 and a capacitance C2G of second capacitor 120 of first torque sensor 96 are used. Accordingly, it is provided that capacitances of capacitors 108, 112, 120, 122, which are situated one behind the other or congruently with respect to shafts 100, 102, are taken into account to form mentioned ratios $\Delta C1A/C1G$, $\Delta C2A/C2G$. However, the largest determined ratio $\Delta C1A/C1G$, $\Delta C2A/C2G$ present at the moment is always used for the evaluation.

In detail, for example, $\Delta C1A/C1G$ is used in the evaluation if $\Delta C1A/C1G > \Delta C2A/C2G$. If $\Delta C1A/C1G < \Delta C2A/C2G$, $\Delta C2A/C2G$ is used in the evaluation.

Figure 11:
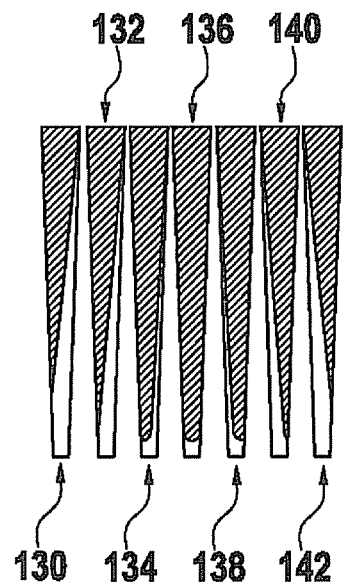
FIG. 11 shows a schematic illustration of a detail of the specific embodiment of the method according to the present invention for determining a torque.

Furthermore, FIG. 11 shows examples of angle-dependent surface portions of a disk 100, 102, shown in FIGS. 8 through 10, between two capacitor plates of a capacitor 108, 112, 120, 122, and thus an overlap of the capacitor plates with disk 100, 102 (hatched area). A white area shows the surface portion of the air between the capacitor plates. A first surface portion 130 corresponds to a deviation of the rotation angle of −3° between shafts 100, 102, a second surface portion 132 corresponds to a deviation of the rotation angle of −2° between shafts 100, 102, a third surface portion 134 corresponds to a deviation of the rotation angle of −1° between shafts 100, 102, a fourth surface portion 136 corresponds to a deviation of the rotation angle of 0° between shafts 100, 102, a fifth surface portion 138 corresponds to a deviation of the rotation angle of +1° between shafts 100, 102, a sixth surface portion 140 corresponds to a deviation of the rotation angle of +2°, and a seventh surface portion 142 corresponds to a deviation of the rotation angle of +3°.

Figure 12:
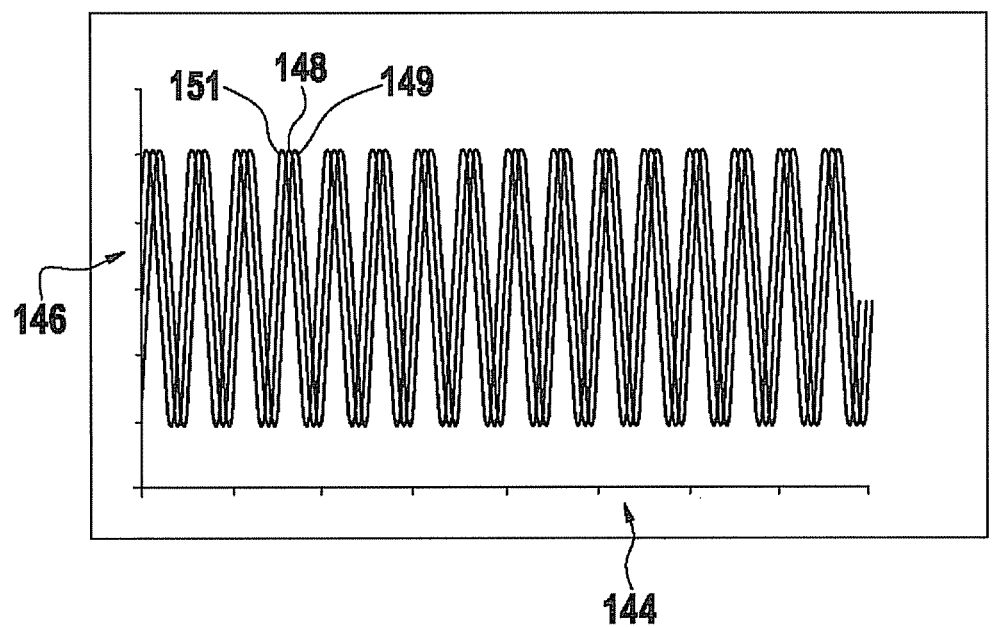
FIG. 12 shows a diagram of the specific embodiment of the method according to the present invention for determining a torque.

The diagram in FIG. 12 includes a horizontally oriented axis 144 along which angles for one revolution between 0° and 360° are plotted. An amplitude based on one of above-mentioned ratios $\Delta C1A/C1G$, $\Delta C2A/C2G$ of ascertained capacitances C1A, C2A, C1G, C2G is plotted along a vertically oriented axis 146. The diagram shows a first curve 148 for the case that both disks 106, 110 are congruent, a second curve 149 for "torsion of +3°" 124, and a third curve 151 for "torsion of −3°" 126.

Figure 13:
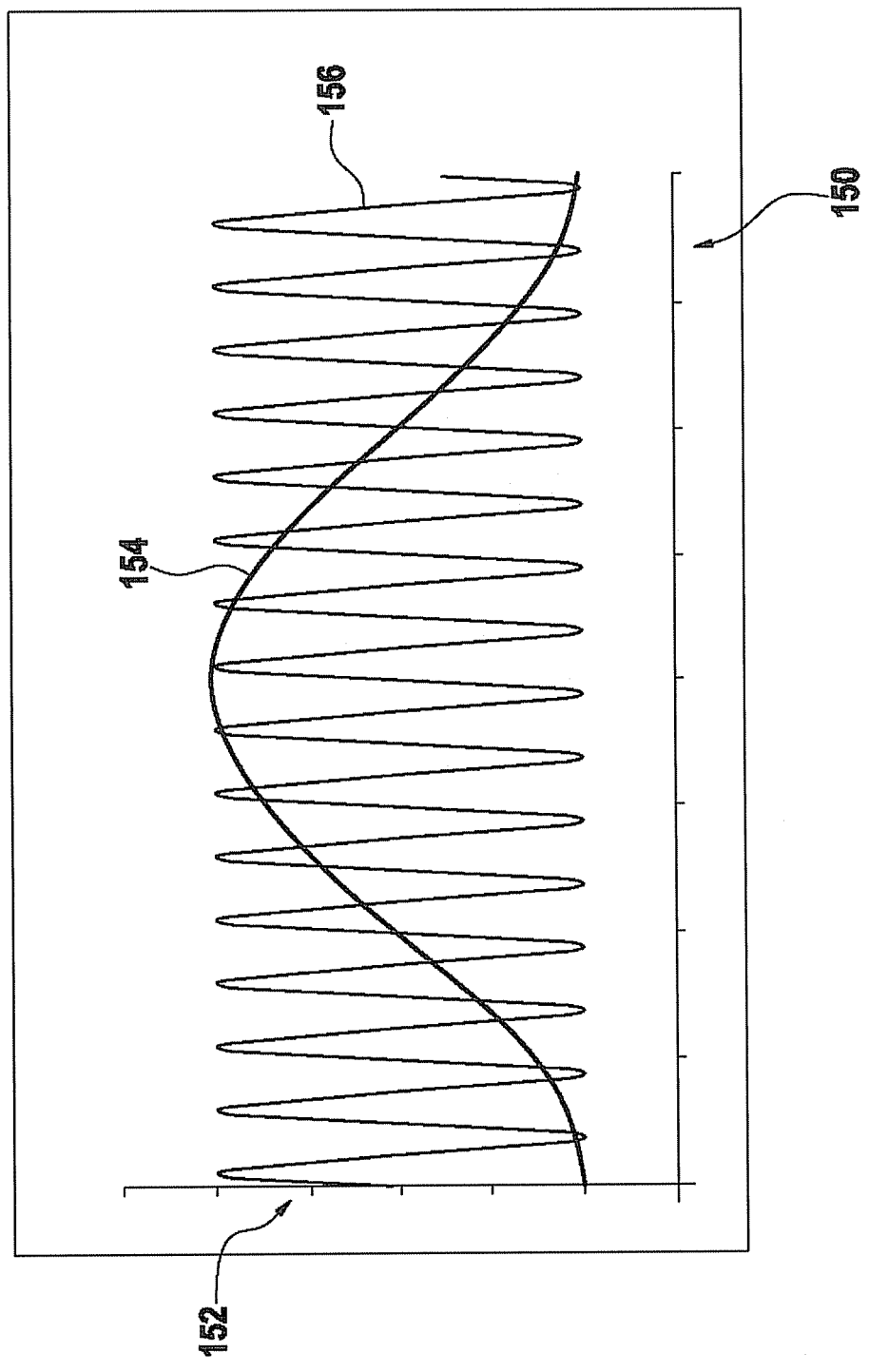
FIG. 13 shows a diagram for comparing the specific embodiments of the method according to the present invention for determining the torque with the example for determining the torque.

The diagram in FIG. 13 includes a horizontally oriented axis 150 along which an angle of 0° to 360° is plotted, and a vertically oriented axis 152 along which an amplitude for a capacitance is plotted. The diagram illustrates a first curve 154 for the amplitude of the capacitance for the example of torque sensor 36 (FIGS. 2 through 4) having a circular disk 38, 42, and a second curve 156 for the second specific embodiment of torque sensor 94 (FIGS. 8 through 10). This diagram in FIG. 13 is thus used to compare the standard signal of the measurable capacitance for a 360° revolution for the example of torque sensor 36 from FIGS. 2 through 4, and for the second specific embodiment of torque sensor 94 from FIGS. 8 through 10. The edge steepness, and thus the change in capacitance, i.e., the angular resolution, is higher in the second specific embodiment having a star-shaped disk 106, 110 as a dielectric.

Figure 14:
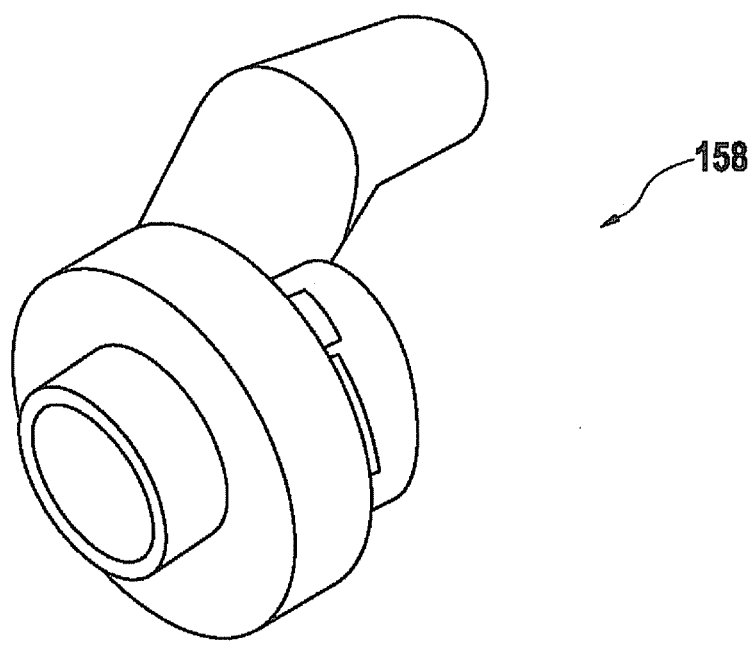
FIG. 14 shows a schematic illustration of another example of a conventional torque sensor.

FIG. 14 shows a schematic illustration of a magnetically measuring torque sensor 158 TSS-1 from Robert Bosch GmbH.

Figure 15:
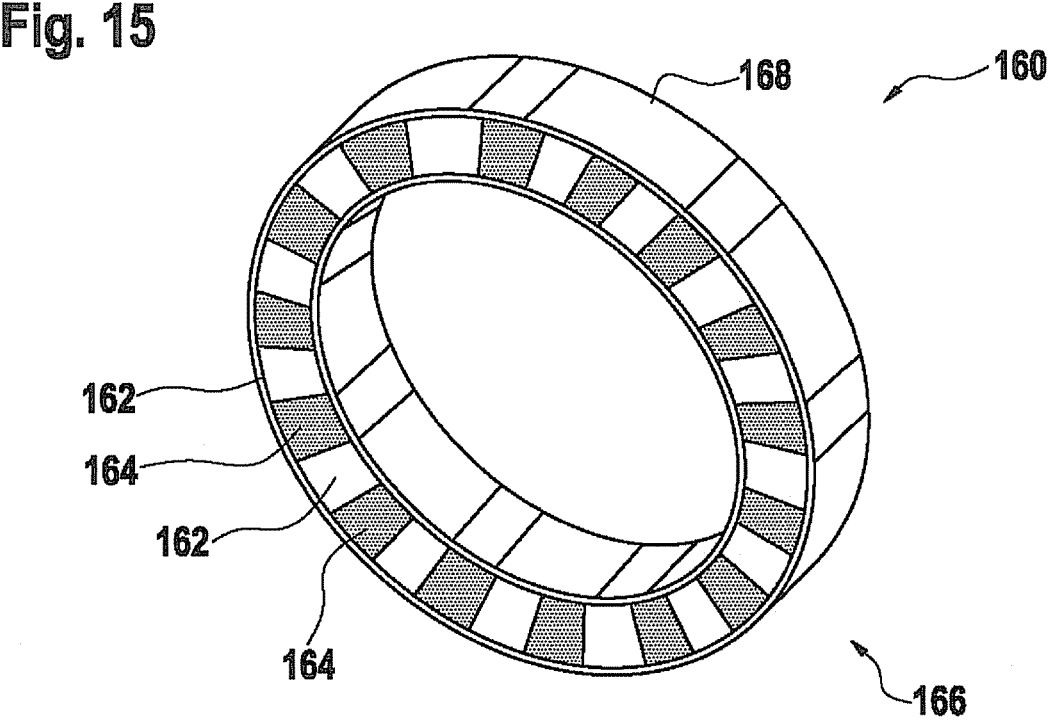
FIG. 15 shows a schematic illustration of a detail of a conventional torque sensor.

FIG. 15 shows a schematic illustration of a conventional system 160 for measuring a torque, which includes a magnet unit 166 composed of north poles 162 and south poles 164, and a measuring ring 168. This type of system 160 is used, for example, in torque sensor 158 shown in FIG. 14.

What is claimed is:

1. A rotation angle sensor, comprising:
   two capacitors having capacitor plates and a dielectric disk, the dielectric disk being rotatably situated between the capacitor plates, and filling out differently sized surface portions between the capacitor plates depending on rotation angle, the dielectric of the capacitors being a star-shaped disk, a center point of the star-shaped disk being symmetrically attached to a pivot point of a shaft, the two capacitors being situated at an angle which is greater than an angle between two star points of the star-shaped disk;
   wherein the rotation angle sensor is configured to determine the rotation angle as a function of a measured value of capacitance of the capacitors.

2. A torque sensor, comprising:
   a first rotation angle sensor and a second rotation angle sensor, each of the first rotation angle sensor and the second rotation angle sensor including two capacitors having capacitor plates and a dielectric disk, the dielectric disk being rotatably situated between the capacitor plates, and filling out differently sized surface portions between the capacitor plates depending on rotation angle, the dielectric of the capacitors being a star-shaped disk, a center point of the star-shaped disk being symmetrically attached to a pivot point of a shaft, the two capacitors being situated at an angle which is greater than an angle between two star points of the star-shaped disk, wherein the rotation angle sensor is configured to determine the rotation angle as a function of a measured value of capacitance of the capacitors;
   wherein the dielectric disks of the first and second rotation angle sensors are connected to one another via a torsion bar.

3. The torque sensor as recited in claim 2, wherein the torque sensor is configured to measure a first capacitance with the aid of the first rotation angle sensor and to measure a second capacitance with the aid of the second rotation angle sensor, and based on a difference of the measured capacitances to determine a difference of rotation angles between the dielectric disks of the rotation angle sensors.

4. A method for determining a rotation angle of a disk which is a dielectric and rotatably situated between capacitor plates of capacitors, in which the disk fills out differently sized surface portions between the capacitor plates depending on the rotation angle of the disk, the method comprising:
   determining the rotation angle as a function of a measured value of the capacitance of the capacitors, wherein a dielectric of the capacitors is a star-shaped disk, a center point of the star-shaped disk being symmetrically attached to a pivot point of a shaft, the two capacitors being situated at an angle which is greater than an angle between two star points of the star-shaped disk.

5. A method for determining a torque between a first disk and a second disk which are connected to one another via a torsion bar, the method comprising:
   ascertaining a first capacitance with the aid of a first rotation angle sensor including two capacitors having capacitor plates and a dielectric disk, the dielectric disk being rotatably situated between the capacitor plates, and filling out differently sized surface portions between the capacitor plates depending on rotation angle, the dielectric of the capacitors being a star-shaped disk, a center point of the star-shaped disk being symmetrically attached to a pivot point of a shaft, the two capacitors being situated at an angle which is greater than an angle between two star points of the star-shaped disk, wherein the rotation angle sensor is configured to determine the rotation angle as a function of a measured value of capacitance of the capacitors;
   ascertaining a second capacitance with the aid of a second rotation angle sensor including two capacitors having capacitor plates and a dielectric disk, the dielectric disk being rotatably situated between the capacitor plates, and filling out differently sized surface portions between the capacitor plates depending on rotation angle, the dielectric of the capacitors being a star-shaped disk, a center point of the star-shaped disk being symmetrically attached to a pivot point of a shaft, the two capacitors being situated at an angle which is greater than an angle between two star points of the star-shaped disk, wherein the rotation angle sensor is configured to determine the rotation angle as a function of a measured value of capacitance of the capacitors; and
   determining the torque based on a difference between the ascertained capacitances.

* * * * *